United States Patent
Meijs et al.

[11] Patent Number: 5,962,611
[45] Date of Patent: Oct. 5, 1999

[54] PERFLUOROALKYLETHER MACROMER HAVING TWO POLYMERIZABLE GROUPS

[75] Inventors: Gordon Francis Meijs, Murrumbena; Bronwyn Glenice Laycock, Heidelberg Heights; Madeleine Clare Griffiths, Hornsby, all of Australia; Edith Cheong, Pulan Pinang, Malaysia

[73] Assignees: Novartis AG, Basel, Switzerland; Commonwealth Scientific and Industrial Research Organisation, Campbell, Australia

[21] Appl. No.: 08/776,996

[22] PCT Filed: Mar. 22, 1996

[86] PCT No.: PCT/EP96/01257

§ 371 Date: Jan. 26, 1998

§ 102(e) Date: Jan. 26, 1998

[87] PCT Pub. No.: WO96/31546

PCT Pub. Date: Oct. 10, 1996

[30] Foreign Application Priority Data

Apr. 4, 1995 [AU] Australia ................................. PN2159

[51] Int. Cl.$^6$ ........................................................ C08F 16/24
[52] U.S. Cl. ........................... 526/247; 526/245; 526/246
[58] Field of Search ..................................... 526/247, 245, 526/246

[56] References Cited

U.S. PATENT DOCUMENTS

| | | | |
|---|---|---|---|
| 4,929,692 | 5/1990 | Goldenberg | 526/247 |
| 4,933,408 | 6/1990 | Goldenberg | 526/247 |
| 5,185,421 | 2/1993 | Cohen et al. | 526/247 |
| 5,247,035 | 9/1993 | Besecke et al. | 526/247 |

FOREIGN PATENT DOCUMENTS

| | | |
|---|---|---|
| 0084406A1 | 1/1982 | European Pat. Off. . |
| 0379462A3 | 1/1989 | European Pat. Off. . |
| 0330618A2 | 8/1989 | European Pat. Off. . |
| 0406161A2 | 6/1990 | European Pat. Off. . |
| 0496320A2 | 12/1991 | European Pat. Off. . |
| WO9415980 | 12/1993 | WIPO . |

*Primary Examiner*—Bernard Lipman
*Assistant Examiner*—N. Sarofim
*Attorney, Agent, or Firm*—Michael U. Lee

[57] ABSTRACT

A macromer of formula (I) is described: $Q\text{-}(PFPE\text{-}L)_{n-1}\text{-}PFPE\text{-}Q$, wherein $n>1.0$; PFPE may be the same or different and is a perfluorinated polyether of formula (II): $-OCH_2CF_2O(CF_2CF_2O)_x(CF_2O)_yCF_2CH_2O-$, wherein the $CF_2CF_2O$ and $CF_2O$ units may be randomly distributed or distributed as blocks throughout the chain and wherein $x$ and $y$ may be the same or different such that the molecular weight of the PFPE is in the range of from 242 to 4,000; L is a difunctional linking group; and Q may be the same or different and is a polymerizable group. The macromer may be used preferably in the production of contact lenses.

28 Claims, No Drawings

PERFLUOROALKYLETHER MACROMER HAVING TWO POLYMERIZABLE GROUPS

The present invention relates to macromers, polymers and polymeric materials particularly suited for use in contact lenses.

In order to properly function as a contact lens a material must have a variety of properties including biological and chemical inertness, mechanical stability, optical transparency, oxygen permeability, and tear wettability. It is particularly advantageous for a contact lens to be able to transmit oxygen to the cornea and to be soft and comfortable to permit wear for extended periods.

Contact lenses can be classified into hard and rigid contact lenses, such as those manufactured from poly (methyl methacrylate), and soft flexible contact lenses such as those manufactured from poly(2-hydroxyethyl methacrylate). Both of these basic types of contact lenses suffer from various limitations. Hard and rigid contact lenses are uncomfortable to wear and thus are not well-tolerated by some patients. Although poly(methyl methacrylate) hard lenses allow the transmission of virtually no oxygen through the lens to support the cornea, there are some classes of rigid lenses that do allow good oxygen passage (for example, silicon-based materials). Notwithstanding this, they suffer from the aforesaid limitation of poor comfort due to their lack of softness. For optimum comfort and handling the modulus of elasticity of the lens material would be from 0.5 to 5.0 MPa, preferably from 1.0 to 2.5 MPa.

Conventional soft contact lenses suffer from the disadvantage that there is insufficient oxygen transmissibility through the lens to support normal corneal physiology. Accordingly, they cannot be worn for extended periods. Clinical symptoms of this lens-induced hypoxia include limbal redness and corneal swelling. Ocular infection may result from extended hypoxia induced by contact lens wear. A minimum oxygen transmissibility would be above 50 Barrer, preferably above 87 Barrer for continuous wear.

There is a long felt need for contact lens materials that combine the comfort of a soft contact lens with an oxygen transmissibility sufficient to maintain normal corneal physiology. In one aspect the present invention provides materials which address this need.

Contact lenses should be comfortable and suitable for use over extended periods. In order to achieve comfort over extended periods a lens must have a low modulus of elasticity (that is, be soft). In addition, it is desirable that it be resistant to fouling by proteins, lipids, mucoids and the like. However, contact lenses must also be of sufficient durability to allow for handling and normal use.

U.S. Pat. No. 4,818,801 describes perfluoropolyether polymers for use as contact lenses. While some lenses manufactured from the perfluoropolyether polymers described in U.S. Pat. No. 4,818,801 have excellent oxygen permeability such lenses remain too stiff, or of too high a modulus, to be useful as comfortable extended wear contact lenses.

There is required a polymer which possesses antifouling properties, oxygen permeability and a low modulus suitable for use in contact lenses and other applications. We have now found a macromonomer which is suitable for use in the manufacture of such polymers. Accordingly, in its main aspect, this invention provides a macromonomer of the formula I:

$$Q\text{-}(PFPE\text{-}L)_{n-1}\text{-}PFPE\text{-}Q \quad (I)$$

wherein n>1.0;
PFPE may be the same or different and is a perfluorinated polyether of formula II:

$$\text{—OCH}_2\text{CF}_2\text{O}(\text{CF}_2\text{CF}_2\text{O})_x(\text{CF}_2\text{O})_y\text{CF}_2\text{CH}_2\text{O—} \quad (II)$$

wherein the $CF_2CF_2O$ and $CF_2O$ units may be randomly distributed or distributed as blocks throughout the chain and wherein x and y may be the same or different such that the molecular weight of the PFPE is in the range of from 242 to 4,000;
L is a difunctional linking group; and
Q may be the same or different and is a polymerizable group.

Preferably n is in the range of from 2 to 5, more preferably in the range of from 2 to 4. We have found that the modulus of elasticity in polymers formed from these macromonomers can be controlled by variation of n. In general, increasing n results in polymers with decreased stiffness.

Q is a polymerizable group which preferably comprises an ethylenically unsaturated moiety which can enter into a polymerization reaction. Preferably Q is a group of the formula A $$P_1(Y)_m\text{-}(R'\text{-}X_1)_p\text{-} \quad (A)$$

wherein Pi is a free-radical-polymerizable group;
Y is —CONHCOO—, —CONHCONH—, —OCONHCO—, —NHCONHCO—, —NHCO—, —CONH—, —NHCONH—, —COO—, —OCO—, —NHCOO— or —OCONH—;
m and p, independently of one another, are 0 or 1;
R' is a divalent radical of an organic compound having up to 20 carbon atoms;
$X_1$ is —NHCO—, —CONH—, —NHCONH—, —COO—, —OCO—, —NHCOO— or —OCONH—.

A free-radical-polymerizable group $P_1$ is, for example, alkenyl, alkenylaryl or alkenylarylenealkyl having up to 20 carbon atoms. Examples of alkenyl are vinyl, allyl, 1-propen-2-yl, 1-buten-2-, -3- and -4-yl, 2-buten-3-yl, and the isomers of pentenyl, hexenyl, octenyl, decenyl and undecenyl. Examples of alkenylaryl are vinylphenyl, vinylnaphthyl or allylphenyl. An example of alkenylarylenealkyl is o-, m-, or p-vinylbenzyl.

$P_1$ is preferably alkenyl or alkenylaryl having up to 12 carbon atoms, particularly preferably alkenyl having up to 8 carbon atoms, in particular alkenyl having up to 4 carbon atoms.

Y is preferably —COO—, —OCO—, —NHCONH—, —NHCOO—, —OCONH—, NHCO— or —CONH—, particularly preferably —COO—, —OCO—, NHCO— or —CONH—, and in particular, —COO— or —OCO—.

$X_1$ is preferably —NHCONH—, —NHCOO— or —OCONH—, particularly preferably —NHCOO— or —OCONH—.

In a preferred embodiment, the indices, m and p, are not simultaneously zero. If p is zero, m is preferably 1.

R' is preferably alkylene, arylene, a saturated bivalent cycloaliphatic group having 6 to 20 carbon atoms, arylenealkylene, alkylenearylene, alkylenearylenealkylene or arylenealkylenearylene.

Preferably, R' is a divalent radical having up to 12 carbon atoms, particularly preferably a divalent radical having up to 8 carbon atoms. In a preferred embodiment, R' is furthermore alkylene or arylene having up to 12 carbon atoms. A particularly preferred embodiment of R' is lower alkylene, in particular lower alkylene having up to 4 carbon atoms.

It is particularly preferred that Q be selected from the group consisting of acryloyl, methacryloyl, styryl, acrylamido, acrylamidoalkyl, urethanemethacrylate, or any substituted derivatives thereof. Most preferably Q is a compound of formula A wherein $P_1$ is alkenyl of up to 4 carbon atoms, Y is —COO—, R' is alkylene of up to 4 carbon atoms, X, is —NHCOO— and m and p are each one.

Suitable substituents may be selected from: alkyl, alkenyl, alkynyl, aryl, halo, haloalkyl, haloalkenyl, haloalkynyl, haloaryl, hydroxy, alkoxy, alkenyloxy, aryloxy, haloalkoxy, haloalkenyloxy, haloaryloxy, nitro, nitroaryl, nitroheterocyclyl, amino, alkylamino, alkenylamino, alkynylamino, arylamino, acyl, aroyl, alkenylacyl, arylacyl, acylamino, alkylsulphonyloxy, arylsulphenyloxy, heterocyclyl, heterocycyloxy, heterocycylamino, haloheterocyclyl, alkoxycarbonyl, alkylthio, alkylsulphonyl, arylthio, arylsulphonyl, aminosulphonyl, dialkylamino and dialkylsulphonyl, having up to 10 carbon atoms.

Preferably x in Formula II is in the range of from 0 to 20, more preferably in the range from 8 to 12, and y is in the range from 0 to 25, more preferably in the range from 10 to 14.

The linking group L may be the bivalent residue of any difunctional moiety able to react with hydroxyl. Suitable precursors to L are α,ω-diepoxides, α,ω-diisocyanates, α,ω-diisothiocyanates, α,ω-diacylhalides, α,ω-dithioacylhalides, α,ω-dicarboxylic acids, α,ω-dithiocarboxylic acids, α,ω-dianhydrides, α,ω-dilactones, α,ω-dialkylesters, α,ω-dihalides, α,ω-dialkyl ethers, α,ω-dihydroxymethylamides. It is preferred that the linking group be a bivalent residue (—C(O)—NH—R—NH—C(O)—) of a diisocyanate wherein R is a divalent organic radical having up to 20 carbon atoms.

The divalent radical R is, for example, alkylene, arylene, alkylenearylene, arylenealkylene or arylenealkylenearylene having up to 20 carbon atoms, a saturated bivalent cycloaliphatic group having 6 to 20 carbon atoms or cycloalkylenealkylenecycloalkylene having 7 to 20 carbon atoms.

In a preferred embodiment, R is alkylene, arylene, alkylenearylene, arylenealkylene or arylenealkylenearylene having up to 14 carbon atoms or a saturated divalent cycloaliphatic group having 6 to 14 carbon atoms. In a particularly preferred embodiment, R is alkylene or arylene having up to 12 carbon atoms or a saturated bivalent cycloaliphatic group having 6 to 14 carbon atoms.

In a preferred embodiment, R is alkylene or arylene having up to 10 carbon atoms or a saturated bivalent cycloaliphatic group having 6 to 10 carbon atoms.

In a particularly preferred meaning, R is a radical derived from a diisocyanate, for example from hexane 1,6-diisocyanate, 2,2,4-trimethylhexane 1,6-diisocyanate, tetramethylene diisocyanate, phenylene 1,4-diisocyanate, toluene 2,4-diisocyanate, toluene 2,6-diisocyanate, m- or p-tetramethylxylene diisocyanate, isophorone diisocyanate or cyclohexane 1,4-diisocyanate.

Aryl is a carbocyclic aromatic radical which is unsubstituted or substituted preferably by lower alkyl or lower alkoxy. Examples are phenyl, tolyl, xylyl, methoxyphenyl, t-butoxy-phenyl, naphthyl and phenanthryl.

Arylene is preferably phenylene or naphthylene, which is unsubstituted or substituted by lower alkyl or lower alkoxy, in particular 1,3-phenylene, 1,4-phenylene or methyl-1,4-phenylene, 1,5-naphthylene or 1,8-naphthylene.

A saturated bivalent cycloaliphatic group is preferably cycloalkylene, for example cyclohexylene or cyclohexylene (lower alkylene), for example cyclohexylenemethylene, which is unsubstituted or substituted by one or more lower alkyl groups, for example methyl groups, for example trimethylcyclohexylenemethylene, for example the bivalent isophorone radical.

For the purposes of the present invention, the term "lower" in connection with radicals and compounds, unless defined otherwise, denotes, in particular, radicals or compounds having up to 8 carbon atoms, preferably having up to 4 carbon atoms.

Lower alkyl has, in particular, up to 8 carbon atoms, preferably up to 4 carbon atoms, and is, for example, methyl, ethyl, propyl, butyl, tert-butyl, pentyl, hexyl or isohexyl.

Alkylene has up to 12 carbon atoms and can be straight-chain or branched. Suitable examples are decylene, octylene, hexylene, pentylene, butylene, propylene, ethylene, methylene, 2-propylene, 2-butylene, 3-pentylene, and the like.

Lower alkylene is alkylene having up to 8 carbon atoms, particularly preferably up to 4 carbon atoms. Particularly preferred meanings of lower alkylene are propylene, ethylene and methylene.

The arylene unit in alkylenearylene or arylenealkylene is preferably phenylene, unsubstituted or substituted by lower alkyl or lower alkoxy, and the alkylene unit therein is preferably lower alkylene, such as methylene or ethylene, in particular methylene. These radicals are therefore preferably phenylenemethylene or methylenephenylene.

Lower alkoxy has, in particular, up to 8 carbon atoms, preferably up to 4 carbon atoms, and is, for example, methoxy, ethoxy, propoxy, butoxy, tert-butoxy or hexyloxy.

Arylenealkylenearylene is preferably phenylene(lower alkylene)phenylene having up to 8, in particular up to 4, carbon atoms in the alkylene unit, for example phenyleneethylene-phenylene or phenylenemethylenephenylene.

Some examples of very preferred diisocyanates from which bivalent residues are derived include trimethylhexamethylenediisocyanate (TMHMDI), isophorone diisocyanate (IPDI), methylenediphenyl diisocyanate (MDI) and 1,6-hexamethyl-enediisocyanate (HMDI).

We have found that in general an appropriate modulus of elasticity and oxygen permeability can be obtained in polymers and copolymers which are derived from these macromonomers which renders such polymers and copolymers particularly useful in the manufacture of comfortable, extended wear soft contact lenses.

A preferred macromonomer is of formula I wherein n is in the range of from 2 to 5, L is a bivalent residue (—C(O)—NH—R—NH—C(O)—) of a diisocyanate wherein R is alkylene, arylene, alkylenearylene, arylene-alkylene or arylenealkylenearylene having up to 14 carbon atoms or a saturated divalent cycloaliphatic group having 6 to 14 carbon atoms, and Q is a compound of formula A wherein $P_1$ is alkenyl of up to 4 carbon atoms, Y is —COO—, R' is alkylene of up to 4 carbon atoms, $X_1$ is —NHCOO— and m and p are each one.

A preferred macromonomer is one in which n is in the range of from 2 to 5, L is the bivalent residue derived from trimethylhexamethylene diisocyanate (TMHMDI) and Q is the residue derived from isocyanatoethyl methacrylate.

A preferred embodiment of this invention is directed to a macromonomer of formula IV:

$CH_2=C(CH_3)COOC_2H_4NHCO$—(—PFPE—CONH—R—
NHCO—)$_{n-1}$—PFPE—CONHC$_2$H$_4$OCOC(CH$_3$)
=CH$_2$ 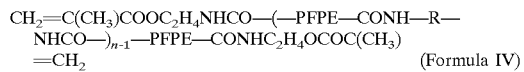 (Formula IV)

wherein PFPE is a perfluorinated polyether of formula 11 as herein defined, wherein x is in the range of from 8 to 10 and y is in the range of from 10 to 14, n>1.0, and R is alkylene or arylene having up to 12 carbon atoms or a saturated bivalent cycloaliphatic group having 6 to 14 carbon atoms.

In a preferred embodiment of the present invention there is provided a macromonomer of formula III:

$CH_2=C(CH_3)COOC_2H_4NHCO$—(—PFPE—CONH—R—
NHCO—)$_{n-1}$—PFPE—CONHC$_2$H$_4$OCOC(CH$_3$)
=CH$_2$ 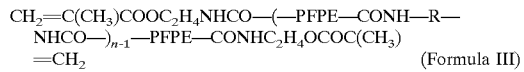 (Formula III)

wherein PFPE is a perfluorinated polyether of formula 11 as herein defined, n>1.0, R is the trimethylhexamethylene component of TMHMDI, and wherein x is in the range of from 8 to 10 and y is in the range of from 10 to 14.

In another aspect, this invention provides a process for the production of polymers. The macromonomers of the present invention may be copolymerized or homopolymerized to afford transparent polymer in the presence of a suitable initiator. Standard methods well known in the art for effecting polymerization may be utilized, with free radical polymerization being preferred. Free radical polymerization can be simply carried out by radiating (using ultra-violet light) monomer mixtures containing a UV initiator, such as benzoin methylether, in an appropriate container or vessel. The mixture is irradiated for a sufficient time to enable polymerization between monomers to take place. Alternatively, thermal initiation using a thermal initiator such as azobisisobutyronitrile, can be employed.

The macromonomer can be converted to a polymer neat or in the presence of one or more solvents. While the structure of the macromonomer has the most significant effect on the resulting modulus, the choice of solvent and comonomer also has an effect. Useful solvents include those selected from the following classes: esters, alcohols, ethers, and halogenated solvents. Fluorinated solvents are particularly useful and their use in combination with other solvents (in ratios varying from 1:9 to 9:1) from the classes above is especially desirable. Solvent concentrations of between 0–70% w/w, particularly 10–50% w/w in the polymerization mixture are desirable. Preferred solvents include acetates, particularly isopropyl acetate and tert-butyl acetate, 2-(trifluoromethyl)-2-propanol, chlorofluoroalkanes, particularly trichlorotrifluoroethane, and perfluorinated alkanes, such as perfluoro-1,3-dimethylcyclohexane and the like.

Comonomers comprising one or more ethylenically unsaturated groups which can enter into a reaction to form a copolymer may be incorporated. It is preferred that the ethylenically unsaturated group be selected from the group consisting of acryloyl, methacryloyl, styryl, acrylamido, acrylamidoalkyl, or urethanemethacrylate, or any substituted derivatives thereof.

A comonomer present in the novel polymer can be hydrophilic or hydrophobic or a mixture thereof. Suitable comonomers are, in particular, those which are usually used in the production of contact lenses and biomedical materials. A hydrophobic comonomer is taken to mean a monomer which typically gives a homopolymer which is insoluble in water and can absorb less than 10% by weight of water. Analogously, a hydrophilic comonomer is taken to mean a monomer which typically gives a homopolymer which is soluble in water or can absorb at least 10% by weight of water.

Suitable hydrophobic comonomers are, without limitation thereto, $C_1$–$C_{18}$alkyl and $C_3$–$C_{18}$cycloalkyl acrylates and methacrylates, $C_3$–$C_{18}$alkylacrylamides and -methacrylamides, acrylonitrile, methacrylonitrile, vinyl $C_1$–$C_{18}$-alkanoates, $C_2$–$C_{18}$alkenes, $C_2$–$C_{18}$haloalkenes, styrene, (lower alkyl)styrene, lower alkyl vinyl ethers, $C_2$–$C_{10}$perfluoroalkyl acrylates and methacrylates and correspondingly partially fluorinated acrylates and methacrylates, $C_3$–$C_{12}$perfluoroalkylethylthiocarbonylaminoethyl acrylates and methacrylates, acryloxy- and methacryloxyalkylsiloxanes, N-vinylcarbazole, $C_1$–$C_{12}$alkyl esters of maleic acid, fumaric acid, itaconic acid, mesaconic acid and the like.

Preference is given, for example, to acrylonitrile, $C_1$–$C_4$alkyl esters of vinylically unsaturated carboxylic acids having 3 to 5 carbon atoms or vinyl esters of carboxylic acids having up to 5 carbon atoms.

Examples of suitable hydrophobic comonomers are methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, butyl acrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethyl-thiocarbonylaminoethyl methacrylate, isobornyl methacrylate, trifluoroethyl methacrylate, hexafluoroisopropyl methacrylate, hexafluorobutyl methacrylate, tristrimethylsilyloxysilyl-propyl methacrylate (hereinafter: Tris methacrylate), tristrimethylsilyloxysilyl-propyl acrylate (hereinafter: Tris acrylate), 3-methacryloxy propylpentamethyldisiloxane and bis(methacryl-oxypropyl) tetramethyldisiloxane.

Preferred examples of hydrophobic comonomers are methyl methacrylate, Tris acrylate, Tris methacrylate and acrylonitrile.

Suitable hydrophilic comonomers are, without this being an exhaustive list, hydroxyl-substituted lower alkyl acrylates and methacrylates, acrylamide, methacrylamide, (lower alkyl)-acrylamides and -methacrylamides, ethoxylated acrylates and methacrylates, hydroxyl-substituted (lower alkyl) acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyl-oxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl) acrylates and methacrylates, allyl alcohol and the like. Preference is given, for example, to N-vinyl-2-pyrrolidone, acrylamide, methacrylamide, hydroxyl-substituted lower alkyl acrylates and methacrylates, hydroxy-substituted (lower alkyl) acrylamides and -methacrylamides and vinylically unsaturated carboxylic acids having a total of 3 to 5 carbon atoms.

Examples of suitable hydrophilic comonomers are hydroxyethyl methacrylate (HEMA), hydroxyethyl acrylate, hydroxypropyl acrylate, trimethylammonium 2-hydroxy propylmethacrylate hydrochloride (Blemer® QA, for example from Nippon Oil), dimethylaminoethyl methacrylate (DMAEMA), dimethylaminoethyl (meth)acrylamide, acrylamide, methacrylamide, N,N-dimethylacrylamide (DMA), allyl alcohol, vinylpyridine, glycerol methacrylate, N-(1,1-dimethyl-3-oxobutyl)acrylamide, N-vinyl-2-pyrrolidone (NVP), acrylic acid, methacrylic acid and the like.

Preferred hydrophilic comonomers are trimethylammonium 2-hydroxy propylmethacrylate hydrochloride, 2-hydroxyethyl methacrylate, dimethylaminoethyl methacrylate, trimethylammonium 2-hydroxypropylmethacrylate hydrochloride, N,N-dimethylacrylamide and N-vinyl-2-pyrrolidone.

As stated hereinbefore, suitable comonomers include fluorine- and silicon-containing alkyl acrylates and hydrophilic comonomers, which to one who is skilled in the art may be selected from a wide range of materials available, and mixtures thereof. Particularly preferred comonomers include dihydroperfluoroalkyl acrylates, such as dihydroperfluorooctyl acrylate and 1,1-dihydroperfluorobutyl acrylate, trihydroperfluoroalkyl acrylates, tetrahydroperfluoroalkyl acrylates, tris(trimethylsilyloxy)propyl methacrylate or acrylate, and amine-containing comonomers, such as N,N-dimethylaminoethyl methacrylate, N,N-dimethylacrylamide and N,N-dimethyl-aminoethyl-acrylamide. The preferred range for addition of individual comonomers into the formulation is from 0 to 60% by weight and most preferably 0 to 40% by weight of the formulation. Mixtures of macromonomers of formula I may also be used to make suitable copolymers with or without other comonomers.

A polymer network can, if desired, be reinforced by addition of a crosslinking agent, for example a polyunsaturated crosslinking comonomer. In this case, the term crosslinked polymers is used. The invention, therefore, furthermore relates to a crosslinked polymer comprising the product of the polymerization of a macromer of the formula (I), if desired with at least one vinylic comonomer and with at least one crosslinking comonomer.

Examples of typical crosslinking comonomers are allyl (meth)acrylate, lower alkylene glycol di(meth)acrylate, poly (lower alkylene) glycol di(meth)acrylate, lower alkylene di(meth)acrylate, divinyl ether, divinyl sulfone, di- and trivinylbenzene, trimethylolpropane tri(meth)acrylate, pentaerythritol tetra(meth)acrylate, bisphenol A di(meth) acrylate, methylenebis(meth)acrylamide, triallyl phthalate and diallyl phthalate.

If a crosslinking comonomer is used, the amount used is in the range of from 0.05 to 20% of the expected total weight of polymer, preferably the comonomer is in the range of 0.1 to 10%, and more preferably in the range of 0.1 to 2%.

According to a further aspect of the present invention there is provided a polymer produced by the process herein defined wherein the polymer comprises at least one macromonomer as herein defined.

According to a further aspect of the present invention there is provided a soft contact lens manufactured from polymers or copolymers as hereinbefore described. According to a subembodiment there is provided a contact lens comprising at least one macromonomer of the formula (I) as hereinbefore defined, and at least one macromonomer of the formula (I) as hereinbefore defined with the exception that in this latter macromonomer n is 1.0. Soft contact lenses are polymer disks with surfaces of differing radii of curvature. The radii are selected in combination with the refractive index of the polymer so that the desired optical correction is obtained and the inner surface of the lens matches the contour of wearer's cornea. They are normally sold in sterile saline. Optionally the surface of the lens may be modified by coating using procedures well known to the art, such as plasma polymerisation, glow discharge or grafting of a more hydrophilic polymer.

By way of example, in the manufacture of such lenses the appropriate quantities of polymerizable monomers, solvent (if required) and photoinitiator are mixed together to form a polymerization mixture. The polymerization mixture is then flushed with nitrogen and the required quantity dispensed into the concave half of a polypropylene mould. The mould is closed and clamped and the assembly is placed into a UV irradiation cabinet equipped with UV lamps. The irradiation is performed for the required time and then the halves of the mould are separated. The polymerized lens is extracted in an appropriate solvent (for example, an isopropyl or tert-butylacetate/fluorinated solvent mixture). The solvent is then extensively exchanged with an alcohol (for example, isopropyl alcohol) and subsequently with saline to yield the product lens.

The polymers produced according to the present invention may be formed into other useful articles using conventional moulding and processing techniques as are well known in the art. Given the visual transparency of the polymers of the present invention, they may find use in tissue culture apparatus, optical instruments, microscope slides and the like.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

The present invention is further described in the following non-limiting examples. If not otherwise specified, all parts are by weight. Temperatures are in degrees Celsius. Molecular weights of macromers or polymers are number average molecular weights if not otherwise specified.

EXAMPLE 1

This example illustrates the preparation of the macromonomer of formula I (n=2.9), where Q is the residue derived from isocyanatoethyl methacrylate, L is the bivalent residue derived from trimethylhexamethylene diisocyanate (TMHMDI), x is 10 and y is 12. Into a 250 ml flask equipped with stirrer bar is placed 100 g of a commercially available hydroxy terminated PFPE (available from Minnesota Mining and Manufacturing Company, St Paul, Minn., USA under the trade name Z-DOL) of hydroxyl number 55.4. To this is added 6.76 g of distilled trimethylhexamethylenediisocyanate. The flask is shaken vigorously for several minutes, and then 0.06 g of dibutyltin dilaurate is added. After being shaken for several more minutes, the mixture is stirred overnight. A mild exotherm is observed during the first half hour. After sixteen hours, the infrared spectrum is run to confirm complete consumption of the isocyanate. To the reaction mixture is then added 5.36 g of freshly distilled isocyanatoethyl methacrylate. The flask is again vigorously shaken for several minutes and the mixture was stirred overnight. An infrared spectrum is recorded to confirm the disappearance of the isocyanate.

This procedure is a general one and with adjustments of stoichiometry other macromonomers of Formula I (n>1), where Q is the residue derived from isocyanatoethyl methacrylate and L is the bivalent residue derived from trimethylhexamethylene diisocyanate (TMHMDI), can be prepared.

EXAMPLE 2

The following composition is placed in a polypropylene disk mold (0.1 mm thick) and polymerized for sixteen hours under irradiation from 365 nm UV lamps.

| | |
|---|---|
| Macromonomer of formula I (n = 2.9) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000: | 60 parts |
| Perfluoro-1,3-dimethylcyclohexane | 20 parts |
| Isopropyl acetate | 20 parts |
| Benzoin methyl ether | 0.1 parts |

After polymerization is complete, the polymeric discs are demoulded, dried overnight at 30° C. in a vacuum oven and extracted at room temperature in a 50/50 (v/v) mixture of trichlorotrifluoroethane/isopropyl acetate (IPAc) for twenty four hours. The discs are then dried again under vacuum overnight. The oxygen transmissibility is measured on the resulting flat clear polymeric discs and shown to be 311 barrers. The modulus is 0.86 MPa.

EXAMPLE 3

The following composition is placed in a polypropylene lens mold and polymerized for sixteen hours under irradiation from 365 nm UV lamps.

| | |
|---|---|
| Macromonomer of formula I (n = 2.9) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000 | 60 parts |
| Dihydroperfluorooctyl acrylate | 20 parts |
| Isopropyl acetate | 20 parts |
| Benzoin methyl ether | 0.1 parts |

After demoulding, the lenses are extracted using the procedure of Example 2. The oxygen transmissibility is measured on the resulting clear polymeric lenses and shown to be 274 barrers. The modulus is 1.59 MPa.

EXAMPLE 4

The following composition is placed in a polypropylene lens mold (0.1 mm thick) and polymerized for sixteen hours under irradiation from 365 nm UV lamps.

| | |
|---|---|
| Macromonomer of formula I (n =2.0) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000 | 60 parts |
| 1,1,2-Trichlorotrifluoroethane | 20 parts |
| Isopropyl acetate | 20 parts |
| Benzoin methyl ether | 0.1 parts |

After polymerisation is complete, the polymeric lenses are demoulded, dried overnight at 30° C. in a vacuum oven and extracted at room temperature in isopropyl acetate (IPAc) for twenty four hours. The discs are then dried again under vacuum overnight before being hydrated in saline for several days. The oxygen transmissibility is measured on the resulting clear polymeric lenses and shown to be 155 barrers. The modulus is 4.1 Mpa.

EXAMPLE 5

The following composition is placed in a polypropylene disk mold (0.1 mm thick) and polymerized for sixteen hours under irradiation from 365 nm UV lamps.

| | |
|---|---|
| Macromonomer of formula I (n = 3.0) where Q is the residue derived from isocyanatoethyl methacrylate, L is the bivalent residue derived from trimethythexamethylene diisocyanate (TMHMDI), x is 10 and y is 12 and the PFPE is of nominal molecular weight 2000 | 60 parts |
| 1,1,2-Trichlorotrifluoroethane | 20 parts |
| Isopropyl acetate | 29 parts |
| Benzoin methyl ether | 0.1 parts |

After demoulding, the discs are extracted and hydrated using the procedure of Example 4. The oxygen transmissibility is measured on the resulting clear flat polymer discs and shown to be 157 barrers. The modulus is 0.54 MPa. In comparison with Example 4, the higher molecular weight macromonomer provides a more desirable lower modulus which is more comfortable for wearing on-eye.

This example is contrasted with the following comparative formulation, which uses a macromonomer which is not part of this invention. This comparative example illustrates the benefits of a selection that includes macromonomers of formula I (n>1) where Q is the residue derived from isocyanatoethyl methacrylate and L is the bivalent residue derived from trimethylhexamethylene diisocyanate (TMHMDI).

COMPARATIVE EXAMPLE 1

The following composition is placed in a polypropylene disk mold (0.1 mm thick) and polymerized for sixteen hours under irradiation from 365 nm UV lamps.

| | |
|---|---|
| Macromonomer of formula I (n = 1) where Q is the residue derived from isocyanatoethyl methacrylate, x is 10 and y is 12 and the PFPE is of nominal molecular weight 2000 | 60 parts |
| Isopropyl acetate | 40 parts |
| Benzoin methyl ether | 0.1 parts |

The oxygen transmissibility is measured on the resulting clear flat polymer discs and shown to be 168 barrers. The modulus is 10 MPa. The material is not suitable for use as an extended wear soft contact lens on account of its high modulus.

EXAMPLE 6

The following composition is placed in a polypropylene disk mold and polymerized for sixteen hours under irradiation from 365 nm UV lamps.

| | |
|---|---|
| Macromonomer of formula I (n = 3.0) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000 | 54 parts |
| Macromonomer of formula I (n = 2.0) where Q is the residue derived from isocyanatoethyl methacrylate, L is the bivalent residue derived from trimethylhexamethytene diisocyanate (TMHMDI), x is 10 and y is 12 and the PFPE is of nominal molecular weight 2000 | 6 parts |
| 1,1,2-Trichlorotrifluoroethane | 20 parts |
| Isopropyl acetate | 20 parts |
| Benzoin methyl ether | 0.1 parts |

After demoulding, the polymeric discs are extracted using the procedure of Example 4. The oxygen transmissibility is measured on the resulting clear flat polymer discs and shown to be 366 barrers. The modulus is 0.92 Mpa.

EXAMPLE 7

The following composition is placed in a polypropylene lens mold (0.1 mm thick) and polymerized for sixteen hours under irradiation from 365 nm UV lamps.

| | |
|---|---|
| Macromonomer of formula I (n = 2.9) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000 | 27 parts |

-continued

| | |
|---|---|
| 1,1-Dihydroperfluorooctyl acrylate | 36 parts |
| 3-[3,3,3,-Trimethyl-1,1-bis(trimethylsiloxy)-disiloxanyl]-propyl acrylate (Tris acrylate) | 13 parts |
| 2-Ethoxyethyl methacrylate | 14 parts |
| Isopropyl acetate | 10 parts |
| Benzoin methyl ether | 0.1 parts |

After polymerization is complete, the polymeric lenses are demoulded, dried overnight at 30° C. in a vacuum oven and extracted at room temperature in isopropyl acetate (IPAc) overnight, then placed in a 50/50 (v/v) mixture of IPAc/isopropyl alcohol (IPA) for three hours and finally into neat IPA for a further three hours. The lenses are then dried again under vacuum overnight before being hydrated in saline for several days. After extraction, the oxygen transmissibility is measured on the resulting clear polymeric lenses and shown to be 165 barrers. The modulus is 0.71 MPa.

EXAMPLE 8

The following composition is placed in a polypropylene lens mold (0.1 mm thick) and polymerized for three hours under irradiation from 365 nm UV lamps.

| | |
|---|---|
| Macromonomer of formula I (n = 2.9) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000 | 45 parts |
| 1,1-Dihydroheptafluorobutylacrylate | 27 parts |
| Dimethylaminoethylacrylamide | 8 parts |
| Isopropyl acetate | 20 parts |
| Benzoin methyl ether | 0.3 parts |

After polymerization is complete, the resulting lenses are demoulded, dried overnight at 30° C. in a vacuum oven and extracted at room temperature in trichlorotrifluoroethane for three hours, then placed in tert-butyl acetate (t-BuAc) overnight, then in a 50/50 mixture of t-BuAc/isopropyl alcohol (IPA) for three hours and finally into neat IPA for 3 hours. The lenses are then dried overnight at 30° C. in a vacuum oven before being hydrated in saline for several days. The oxygen transmissibility is measured on the resulting clear polymeric lenses and shown to be 85 barrers. The modulus is 2.24 MPa. The water content is 15%.

EXAMPLE 9

The following composition is placed in a polypropylene disk mold (0.1 mm thick) and polymerized for sixteen hours under irradiation from 365 nm UV lamps.

| | |
|---|---|
| Macromonomer of formula I (n = 4.0) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000 | 60 parts |
| Dimethylaminoethyl methacrylate | 20 parts |
| Isopropyl acetate | 20 parts |
| Benzoin methyl ether | 0.1 parts |

After demoulding, the discs are extracted and hydrated using the procedure of Example 7. The oxygen transmissibility is measured on the resulting clear flat polymer discs and shown to be 115 barrers. The modulus is 1.55 Mpa. The water content is 15%.

EXAMPLE 10

The following composition is placed in a polypropylene lens mold (0.1 mm thick) and polymerized for sixteen hours under irradiation from 365 nm UV lamps.

| | |
|---|---|
| Macromonomer of formula I (n = 4.0) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000 | 43 parts |
| Dimethylacrylamide | 15 parts |
| Dihydroperfluorooctyl acylate | 22 parts |
| Isopropyl acetate | 20 parts |
| Benzoin methyl ether | 0.1 parts |

After polymerization is complete, the resulting lenses are demoulded, dried overnight at 30° C. in a vacuum oven and extracted at room temperature in trichlorotrifluoroethane (TCTFE) for three hours. They are then placed in a 50/50 (v/v) mixture of TCTFE/isopropyl acetate (IPAc) overnight, then in neat IPAc for one hour, then in a 50/50 (v/v) mixture of IPAc/isopropyl alcohol (IPA) for one hour and finally into neat IPA for a further hour. The lenses are then dried again under vacuum overnight before being hydrated in saline for several days. The oxygen transmissibility is measured on the resulting clear polymeric lenses and shown to be 71 barrers. The modulus is 0.96 Mpa. The water content is 16%.

EXAMPLE 11

The following composition is placed in a polypropylene lens mold and polymerized for three hours under irradiation from 365 nm UV lamps.

| | |
|---|---|
| Macromonomer of formula I (n = 2.0) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000 | 50 parts |
| 1,1-Dihydroperfluorooctyl acrylate | 17 parts |
| Dimethylaminoethyl methacrylate | 17 parts |
| Isopropyl acetate | 17 parts |
| Benzoin methyl ether | 0.3 parts |

After demoulding, the lenses are extracted and hydrated using the procedure of Example 8. The oxygen transmissibility is measured on the resulting clear polymeric lenses and shown to be 83 barrers. The modulus is 2.5 Mpa. The water content is 9%.

The results above can be contrasted with those from the following formulation, which uses a macromonomer that falls outside the scope of the present invention.

COMPARATIVE EXAMPLE 2

The following composition is placed in a polypropylene lens mold and polymerized for three hours under irradiation from 365 nm UV lamps.

| | |
|---|---|
| Macromonomer of formula I (n = 1.0) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000 | 50 parts |
| 1,1-Dihydroperfluorooctyl acrylate | 17 parts |
| Dimethylaminoethyl methacrylate | 17 parts |
| Isopropyl acetate | 17 parts |
| Benzoin methyl ether | 0.3 parts |

After demoulding, the lenses are extracted and hydrated using the procedure of Example 8. The oxygen transmissibility is measured on the resulting clear polymeric lenses and shown to be 67 barrers. The modulus is 5.6 Mpa. The water content is 5%.

EXAMPLE 12

The following composition is placed in a polypropylene lens mold and polymerized for three hours under irradiation from 365 nm UV lamps.

| | |
|---|---|
| Macromonomer of formula I (n = 2.9) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000 | 50 parts |
| 1,1-Dihydroperfluorooctyl acrylate | 17 parts |
| Dimethylaminoethyl methacrylate | 17 parts |
| Isopropyl acetate | 17 parts |
| Benzoin methyl ether | 0.3 parts |

After polymerization is complete, the resulting lenses are demoulded, dried overnight at 30° C. in a vacuum oven and extracted at room temperature in FC75 (a perfluorinated solvent available from Minnesota Mining and Manufacturing Company (3M)) for three hours, then placed in tert-butyl acetate (t-BuAc) overnight, then in a 50/50 mixture of t-BuAc/isopropyl alcohol (IPA) for three hours and finally into neat IPA for 3 hours. The lenses are then dried overnight at 30° C. in a vacuum oven before being hydrated in saline for several days. The oxygen transmissibility is measured on the resulting clear polymeric lenses and shown to be 80 barrers. The modulus is 1.4 Mpa. The water content is 10%.

EXAMPLE 13

The following composition is placed in a polypropylene lens mold and polymerized for three hours under irradiation from 365 nm UV lamps.

| | |
|---|---|
| Macromonomer of formula I (n = 4.0) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000 | 50 parts |
| 1,1-Dihydroperfluorooctyl acrylate | 17 parts |
| Dimethylaminoethyl methacrylate | 17 parts |
| Isopropyl acetate | 17 parts |
| Benzoin methyl ether | 0.3 parts |

After demoulding, the lenses are extracted and hydrated using the procedure of Example 12. The oxygen transmissibility is measured on the resulting clear polymeric lenses and shown to be 90 barrers. The modulus is 0.79 Mpa. The water content is 16%.

EXAMPLE 14

The following composition is placed in a polypropylene lens mold and polymerized for three hours under irradiation from 365 nm UV lamps.

| | |
|---|---|
| Macromonomer of formula I (n = 2.9) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000 | 34 parts |
| 1,1-Dihydroperfluorobutyl acrylate | 28 parts |
| Dimethylaminoethyl acrylamide | 9 parts |
| 2-Ethoxyethyl methacrylate | 9 parts |
| Isopropyl acetate | 20 parts |
| Benzoin methyl ether | 0.3 parts |

After polymerization is complete, the resulting lenses are demoulded, dried overnight at 30° C. in a vacuum oven and extracted at room temperature in trichlorotrifluoroethane (TCTFE) for three hours, then placed in tert-butyl acetate (t-BuAc) overnight, and finally into neat isopropyl alcohol for 3 hours. The lenses are then dried overnight at 30° C. in a vacuum oven before being hydrated in saline for several days. The oxygen transmissibility is measured on the resulting clear polymeric lenses and shown to be 53 barrers. The modulus is 1.05 MPa. The water content is 18%.

EXAMPLE 15

This example demonstrates that the choice of polymerization solvent affects the modulus of the material.

The following compositions are placed in a polypropylene lens mold and polymerized for fourteen hours under irradiation from 365 nm UV lamps. (All parts are parts by weight).

| | |
|---|---|
| Macromonomer of formula I (n = 2.9) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000 | 60 parts |
| Benzoin methyl ether | 0.1 parts |
| Solvent | See Table 1 for no. of parts used |

After demoulding, the lenses are extracted using the procedure of Example 2 above. The resulting clear polymeric lenses are measured for modulus, with the results given in Table I.

TABLE I

Effect of Solvents Used in
Polymerization on Properties of Polymer

| Sample Description | Expansion Factor in Trichlorotrifluoroethane | Modulus (MPa) |
|---|---|---|
| "high modulus" solvents (E > 1.5 MPa) | | |
| no solvent | 1.19 | 2.09 |
| 40% perfluoro-1,3-dimethylcyclo-hexane | 1.24 | 1.76 |
| 40% trichlorotrifluoroethane | 1.29 | not determined (stiff) |

TABLE I-continued

Effect of Solvents Used in
Polymerization on Properties of Polymer

| Sample Description | Expansion Factor in Trichloro-trifluoroethane | Modulus (MPa) |
|---|---|---|
| "low modulus" solvents (E < 1.5 MPa) | | |
| 40% IPAc (isopropylacetate) | 1.38 | too soft to handle |
| 20% trifluorotrichloroethane/20% IPAc | 1.38 | 0.8 |
| 20% perfluoro-1,3-dimethyl-cyclohexane/20% IPAc | 1.34 | 0.82 |
| 40% 2-(trifluoromethyl)-2-propanol | 1.34 | 1.23 |
| 40% tert-Butyl Acetate | 1.38 | 0.64 |
| 20% tert-Butyl Acetate, 20% IPAc | 1.33 | 0.82 |

EXAMPLE 16

This example demonstrates how modulus can be varied, relatively independently of oxygen permeability, by adjusting the proportion of macromonomer of formula I (n>1) in a mixture of the following composition, which is placed in a polypropylene disk mold (0.1 mm thick) and polymerized for 16 hours under irradiation from 365 nm lamps.

| | |
|---|---|
| A mixture (in proportions as described in Table II) of macromonomers of formula I (n = 1.0 and 4.0) where Q is the residue derived from isocyanatoethyl methacrylate, L is the bivalent residue derived from trimethylhexamethylene diisocyanate (TMHMDI), x is 10 and y is 12 and the PFPE is of nominal molecular weight 2000 | 60 parts |
| Perfluoro-1,3-dimethylcyclohexane | 20 parts |
| Isopropyl acetate | 20 parts |
| Benzoin methyl ether | 0.1 parts |

The example uses a mixture of macromonomer of formula I (n=4.0), where Q is the residue derived from isocyanatoethyl methacrylate and L is the bivalent residue derived from trimethylhexamethylene diisocyanate (TMHMDI), blended in various proportions with a macromonomer of formula I (n=1.0) where Q is the residue derived from isocyanatoethyl methacrylate. After demoulding, the flat discs are extracted using the procedure of Example 2 above. The oxygen transmissibility is measured on the resulting clear polymeric discs. The use of macromonomer of formula I (n=1.0), where Q is the residue derived from isocyanatoethyl methacrylate, alone is not part of the present invention, but the use of it in combination with a macromonomer of formula I (n>1), where Q is the residue derived from isocyanatoethyl methacrylate and L is the bivalent residue derived from trimethylhexamethylene diisocyanate (TMHMDI), is a particular embodiment of the present invention. The results appear in Table II.

TABLE II

| Macromoner of Formula I (n = 1) parts by weight | Macromonomer of Formula I (n = 4) parts by weight | Ratio Formula I (n = 4) to Formula I (n = 1) | Oxygen permeability (barrers) | Modulus (MPa) |
|---|---|---|---|---|
| 22 | 38 | 1.73 | 292 | 2.2 |
| 20 | 40 | 2.00 | 315 | 1.9 |
| 18 | 42 | 2.33 | 311 | 2.2 |
| 16 | 44 | 2.75 | 298 | 1.8 |
| 14 | 46 | 3.29 | 351 | 1.4 |
| 12 | 48 | 4.00 | 352 | 1.6 |
| 10 | 50 | 5.00 | 368 | 1.1 |

The example shows that the modulus can be lowered relatively independently of oxygen permeability by increasing the proportion of macromonomer of Formula I (n=4.0), where Q is the residue derived from isocyanatoethyl methacrylate and L is the bivalent residue derived from trimethylhexamethylene diisocyanate (TMHMDI).

Those skilled in the art will appreciate that the invention described herein is susceptible to variations and modifications other than those specifically described. It is to be understood that the invention includes all such variations and modifications which fall within the its spirit and scope. The invention also includes all of the steps, features, compositions and compounds referred to or indicated in this specification, individually or collectively, and any and all combinations of any two or more of said steps or features.

The claims defining the invention are as follows:

1. A macromonomer of the formula I:

$$Q\text{-}(PFPE\text{-}L)_{n-1}\text{-}PFPE\text{-}Q \qquad (I)$$

wherein n>1.0;
PFPE may be the same or different and is a perfluorinated polyether of formula II:

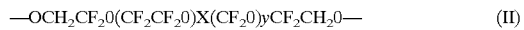

$$-OCH_2CF_2O(CF_2CF_2O)X(CF_2O)yCF_2CH_2O- \qquad (II)$$

wherein the CF2CF2O and CF2O units may be randomly distributed or distributed as blocks throughout the chain and wherein x and y may be the same or different such that the molecular weight of the PFPE is in the range of from 242 to 4,000;
L is a difunctional linking group; and
Q may be the same or different and is a ethylenically unsaturated polymerizable group,
wherein said macromer is free of polyalkylether segments.

2. A macromonomer according to claim 1 wherein n is in the range of from 2 to 5.

3. A macromonomer according to claim 1 wherein n is in the range of from 2 to 4.

4. A macromonomer according to claim 1 wherein Q is a polymerizable group which comprises an ethylenically unsaturated moiety.

5. A macromonomer according to claim 1 wherein Q is selected from the group consisting of acryloyl, methacryloyl, styryl, acrylamido, acrylamidoalkyl, urethanemethacrylate, or any substituted derivatives thereof.

6. A macromonomer according to claim 1 wherein L is a bivalent residue (—C(O)—NH—R—NH—C(O)—) of a diisocyanate wherein R is a divalent organic radical having up to 20 carbon atoms.

7. A macromonomer according to claim 6 wherein the bivalent residue is derived from a diisocyanate selected from the group consisting of trimethylhexamethylenediisocyanate (TMHMDI), isophorone diisocyanate (IPDI), methylenediphenyl diisocyanate (MDI) and 1,6-hexamethylenediisocyanate (HMDI).

8. A macromonomer according to claim 1 wherein x is in the range of from 0 to 20.

9. A macromonomer according to claim 8 wherein x is in the range from 8 to 12.

10. A macromonomer according to claim 1 wherein y is in the range of from 0 to 25.

11. A macromonomer according to claim 10 wherein y is in the range from 10 to 14.

12. A macromonomer according to claim 1 wherein n is in the range of from 2 to 5, L is the bivalent residue derived from trimethylhexamethylene diisocyanate (TMHMDI) and Q is the residue derived from isocyanatoethyl methacrylate.

13. A macromonomer of the formula III:

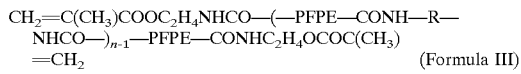
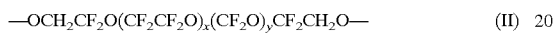
(Formula III)

wherein PFPE is a perfluorinated polyether of formula II $$-OCH_2CF_2O(CF_2CF_2O)_x(CF_2O)_yCF_2CH_2O-\qquad (II)$$

wherein the $CF_2CF_2O$ and $CF_2O$ units may be randomly distributed or distributed as blocks throughout the chain, n>1.0, R is the trimethylhexamethylene component of TMHMDI, and wherein x is in the range of from 8 to 10 and y is in the range of from 10 to 14.

14. A process for the production of a polymer comprising the step of polymerizing a macromonomer of claim 13.

15. A process for the production of a polymer comprising the step of polymerizing a macromonomer of claim 1.

16. A process according to claim 15 wherein the macromonomer is converted to a polymer in the presence of at least one solvent.

17. A process according to claim 16 wherein the solvent is selected from the group consisting of esters, alcohols, ethers, and halogenated solvents.

18. A process according to claim 17 wherein the solvent is selected from the group consisting of isopropyl acetate, tert-butyl acetate, 2-(trifluoromethyl)-2-propanol, trichlorotrifluoroethane and perfluoro-1,3-dimethylcyclohexane.

19. A process according to claim 15 wherein the macromonomer is copolymerized with at least one comonomer comprising one or more ethylenically unsaturated groups selected from the group consisting of acryloyl, methacryloyl, styryl, acrylamido, acrylamidoalkyl, urethanemethacrylate, or any substituted derivatives thereof, and mixtures thereof.

20. A process according to claim 19 wherein the comonomer is selected from the group consisting of dihydroperfluorooctyl acrylate, 1,1-dihydroperfluorobutyl acrylate, tris (trimethylsilyloxy)propyl methacrylate or acrylate, and amine-containing comonomers, such as N,N-dimethylaminoethyl methacrylate, N,N-dimethyl acrylamide and N,N-dimethylaminoethyl-acrylamide, and mixtures thereof.

21. A process according to claim 19 wherein the macromonomer is copolymerized with at least one comonomer wherein each comonomer is present in the polymerization formulation in the range of from 0 to 60% by weight of the formulation parts.

22. A process according to claim 21 wherein the macromonomer is copolymerized with at least one comonomer wherein each comonomer is present in the polymerization formulation in the range of 0 to 40% by weight of the formulation.

23. A polymer produced by a process according to claim 21.

24. A soft contact lens manufactured from a polymer produced by a process according to claim 21.

25. A soft contact lens comprising a macromonomer according to claim 1.

26. A process for the production of a soft contact lens according to claim 25 wherein said process comprises the steps of:

(a) mixing at least one macromonomer according to claim 1 with an optional solvent, a photoinitiator, an optional comonomer to form a polymerization mixture;

(b) flushing the polymerization mixture with nitrogen;

(c) charging the polymerization mixture into the concave half of polypropylene mould;

(d) closing the charged mould;

(e) irradiating the charged mould with UV radiation; and separating the halves of the mould and extracting the polymerized lens.

27. A contact lens comprising (a) at least one macromonomer of the formula (I) as defined in claim 1, and (b) at least one macromonomer of the formula (I) as defined in claim 1 with the exception that in this macromonomer n is 1.0.

28. A soft contact lens according to claim 25 wherein the surface of the lens is modified by a coating which is more hydrophilic than the lens before modification.

* * * * *